Patented Jan. 19, 1954

2,666,719

UNITED STATES PATENT OFFICE 2,666,719

RESINOUS COATED ARTICLE AND METHOD OF MAKING SAME

Kenneth J. Lissant, Kirkwood, Mo., assignor to Petrolite Corporation, Wilmington, Del., a corporation of Delaware No Drawing. Application March 28, 1950,
Serial No. 152,501

22 Claims. (Cl. 117—132)

1

This invention relates to synthetic chemical coating compositions, to methods for manufacturing and using the same, and to the coated surfaces resulting from the application of such compositions. It is in part a continuation of my earlier application, Serial No. 53,751, filed October 9, 1948, now abandoned.

The present invention resides in the fact that a coating of unusual properties, particularly from a standpoint of adherence to metal surfaces and from the standpoint of resistance to various corrosive environments can be prepared from a furfural-furfuryl alcohol resin employing certain polymers in combination, provided that the cure of the resin is controlled by the selection of a water-insoluble clay or clay-like mineral of appropriate character.

These new and useful features are emphasized by the fact that similar properties are not obtainable by the use of an inert filler and nonactive clay or insoluble inorganic material along with an acid catalyst whether said acid is organic or inorganic.

The protection of surfaces, both metallic and nonmetallic, from attack by the natural elements and by industrial or commercially produced harmful materials has long been attacked from many viewpoints; and many specific solutions to many specific problems have been devised, few of them yet wholly satisfactory. Ordinary exposure of buildings and adjuncts to the elements results in corrosion of metallic parts by oxygen, and sometimes by industrial gases, water, solutions of salts, etc. All industrial processing equipment and apparatus is attacked to a greater or lesser degree by the materials being handled. Marine equipment is exposed to attack by the atmosphere, by water either fresh or saline, etc. The surfaces requiring protection include the metallic and the non-metallic. In texture, they range from non-porous, such as steel, glass, and some stone, to porous surfaces like wood and certain other stones.

The products of the invention are protective coating compositions prepared from a mixture of furfural and furfuryl alcohol, a vinyl polymer resin, and a bentonitic clay, the mixture being subjected to the action of a suitable acidic catalyst, and the final composition, as prepared for application, containing a suitable organic solvent.

While I have applied the coating compositions of my invention principally to the protection of the surfaces of ferrous processing equipment and apparatus used in the oil industry, they are applicable to all the surface-protection problems mentioned above, being easily compounded, easily applied, and very efficient in properties. The compositions of the invention

2 have been applied to date principally to crude oil storage tanks. They are specifically applicable also to other related equipment, such as oil production, storage and transportation equipment used in wells, lines, tank trucks, and the like.

A wholly satisfactory protective coating material should have a number of important characteristics. It should be relatively stable as compounded, so as to have a comparatively long shelf-life. It should be easily applicable, as by spraying. (In spray-coating, thixotropy is often a desirable characteristic of the coating material.) As applied, the material should not sag, run, or curtain, but should remain in place until the initial set, cure or solvent evaporation has occurred. This means it should be sufficiently viscous and/or thixotropic so as not to run down a vertical surface before setting takes place. It should not be so viscous that cobwebbing occurs as the material issues from the orifice of a spray gun. It should be slow to set or cure in bulk, as in a spray gun; but should be comparatively quicksetting in thin films as applied. My compositions are endowed with these favorable characteristics.

A satisfactory coating should also be durable, and preferably against as large and diversified a collection of conditions and influences as possible. It should have resistance to water and solutions of salts, to acidic and alkaline materials, to solvents, to corrosive gases and vapors. Specifically, in the oil industry a satisfactory coating should be resistant to the foregoing elements and also to waters of the character of oil field waters, to crude oil, petroleum fractions, wet gases and vapors, hydrogen sulfide, ammonia, carbon dioxide, oxygen, and all acidic and alkaline media resulting from processing operations. My compositions are particularly and specifically applicable to use on oil industry equipment, especially on oil storage tanks.

A satisfactory coating should have good adhesion characteristics, particularly toward steel surfaces because of the prevalence of steel equipment in industry generally and in the oil industry in particular. Not only should such coating adhere to the surface when applied thereto; it should also resist shock and should not chip off or crack when struck. Since it is intended to be a protective coating, it should obviously be non-porous in character. It should be non-blistering on drying or on being subjected to at least moderately increased temperatures. My compositions have these desirable properties. Specifically, as to the last recited property, I have subjected a steel test plate, coated with one of my materials, to the action of boiling kerosene for more than 3 hours, without visible deterioration of such film. This experiment proves the applicability of my coatings to the protection of equipment subjected to petroleum distillate vapors, even at somewhat elevated temperatures. My materials do not melt or blister or become markedly embrittled under such conditions of moderately elevated temperature, i. e., they have good temperature stability. My compositions, furthermore, have a reasonably smooth surface, as applied, and have good abrasion-resistance.

Any class of satisfactory coating compositions should have a range of members, exhibiting any desired balance between flexibility and rigidity of surface. By this I mean that under some service conditions appreciable flexibility of the coating film is required. For example, oil field storage tank surfaces are repeatedly flexed under the influence of temperature variations produced by sun heat, rain, night chill, etc. When applied to a porous surface, such as a wood desk top, the coating composition would be required to possess practically no flexibility, but should be hard, almost to the point of being brittle. Flexibility, where required, should persist over the whole range of temperatures to be expected, in service. Ordinarily, such temperature range would be about 0–150° F. The material should not sag or flow when applied, or chip after application, under such temperature conditions. My compounds compare favorably with any heretofore produced in these respects.

As to those coating compositions that become useful by virtue of curing in situ, it is obviously preferable that curing be effected at atmospheric temperature rather than at elevated temperatures, i. e., that the coating air-cure rather than require baking. While my compositions can be prepared in formulations that are useful in producing baked finishes, one of the especial advantages in their use in that they cure rapidly and adequately at atmospheric temperatures. They are also adaptable to application as lacquers are employed, with solvents, to produce air-dried finishes by evaporation of such solvents. My preferred composition, however, is one that sets or cures at atmospheric temperatures by virtue of undergoing polymerization in situ, on application.

Full variability of color is a characteristic of the ideal coating composition; but this is one that my compositions do not enjoy, except to a limited degree. Where black or dark coatings are acceptable, my compositions will be found valuable for the reason that they possess to a marked degree most of the foregoing favorable characteristics.

Of the many coating compositions that have been suggested, like paints, lacquers, varnishes, etc., all have proved to be non-resistant to one or more important elements or conditions, even though their cost is often great. Even with the recent very rapid and even revolutionary advances in plastics technology, in which many classes of polymers have been applied to a great many types of coating problems, no satisfactory solution has been found to many crying problems. Specifically, the urgent need for a practicable coating composition for use in the tank coating art was responsible for the present invention. For this reason, the invention will be illustrated principally by references to tank coating practice; but it is not to be limited thereto, as the foregoing description has shown it to be applicable to many other problems.

My compositions are susceptible to use by gun-spraying; they are substantially non-sagging as applied to vertical surfaces; they adhere satisfactorily to steel surfaces; they are comparatively slow-setting in bulk, but comparatively fast-curing as films; their curing is controlled at least in part by their clay constituents; and thin films produced from them are substantially non-porous and are sufficiently flexible as to be substantially non-chipping under the conditions of use of the coated surface.

I am aware of the fact that certain combinations of furfural, furfuryl alcohol, and vinyl polymers have been suggested for use as coating compositions. I am aware that acidic polymerization catalysts have been employed to catalyze polymerization reactions in some such polymerizable systems. I am also aware that fillers have been incorporated in some polymer coating compositions. While some of the conditions and proportions of ingredients to which the compositions of the invention are limited may superficially appear to differ only slightly from those of certain known coating compositions, it is important to note that such differences represent the difference between operability and inoperability, between practicability and impracticability. So far as I am aware, my coating compositions have never been known, made, or used, although their value surpasses that of any of such heretofore known compounds for many purposes. It should be noted that I do not claim all possible proportions of the respective ingredients employed to produce my compounds, but have strictly limited myself herein as to the proportions which are to be used, as will be seen from the following description.

My compositions include a number of different classes of ingredients. One class is a mixture of furfural and furfuryl alcohol, the proportions of the two employed varying with the final use expected to be made of the finished composition. The use of furfural alone tends to give a glassy, hard or brittle coating; the use of furfuryl alcohol alone tends to give a spongy coating, at least in my experiments to date. In my preferred composition I employ these two furan derivatives in the proportion of 55:45, furfural-to-furfuryl alcohol. Satisfactory compositions have been made with ratios ranging from 45:55 to 65:35.

The technical grades of both furan derivatives are satisfactorily employed. I have compared a sample of furfural, freshly prepared by distillation, with a sample of the technical grade product and found no difference in the compositions produced therefrom. Likewise, I have compared the compositions made from a water-white, freshly distilled sample of furfuryl alcohol and from an old sample of the technical grade reagent, and found no difference between the two coating compositions, as prepared. Probably the most important specification is water content, which should be low to avoid subsequent dilution of catalyst and possible ill effects on adherence of coating films to the surface to be protected. Since the technical grades of both materials contain only a small fraction of 1% of water, such technical grade products are acceptable as ingredients.

The second ingredient of my composition is a polyvinyl resin. Specifically I prefer to employ a technical grade product such as that marketed by the Bakelite Corporation under the trade name "Vinylite XYHL." As a trade classification this particular grade is designated by the manufacturer as a low molecular weight polyvinyl resin and such designation is all that is required for identification. Polyvinyl chloride or copolymerized polyvinyl chloride-acetate resin may also be used. Such polyvinyl resins are valuable here as they are known to dissolve in and thicken mixtures of furfural and furfuryl alcohol. In general, I prefer to employ such amount of the polymer as will almost prevent sagging of the film when the composition is applied to a non-porous vertical surface such as steel. Final correction of sagging is accomplished by clay addition as stated below. I use less vinyl polymer than required to produce cobwebbing in spray-coating application. For use on porous surfaces, of course, sagging is not a problem, because even water-thin compositions are absorbed by surface pores. In such instances, the polyvinyl resin proportion may be markedly reduced from the previously specified amount. It appears to promote adhesion of the film to the surface being coated. It also appears to plasticize the coating film on application to surfaces. It should be stated that, when the preferred example recited below was prepared using clay but without using the polyvinyl resin ingredient, the composition gave marked run-down when applied to a vertical steel surface. However, on horizontal surfaces the cure was satisfactory.

The vinyl resins previously described constitute the more important and readily available members of this class. The entire class is commonly referred to as vinyl resins or vinyl polymers. (See "The Chemistry of Commercial Plastics," Wakeman, Reinhold Publishing Corporation, New York, 1947.) Other members of the class of commercial vinyl polymers or resins include vinyl ethers as well as vinyl formal and vinyl acetal. Generally speaking, the specific class employed herein are the hard vinyl resins or polymers. These resins are distinguished by being dry solids at room temperature rather than viscous liquids or gummy solids. It is obvious, of course, in light of what has been said that the resins herein employed must be ketone-soluble. For purpose of convenience the class will be referred to as "hard ketone-soluble vinyl resins" with the understanding that the reference is to the commercial class of materials as available in the open market.

The third class of ingredient in my composition is a montmorillonite clay. This is in no sense added as a filler or inert material. On the contrary, it supplies the important characteristic of thixotropy to my composition and hence ameliorates sagging characteristics in the films as applied, at the same time permitting use of the composition in spray guns, wherein it remains fluid as applied. A more important characteristic imparted by this constituent is that a reduced proportion of acidic polymerization catalyst is required when such montmorillonite clay is present, the reduction in required proportion of catalyst sometimes amounting to 80% or more.

Finally, this constituent is unique in that it promotes the curing of the film after application, and directs the course of the reaction to produce a desirable product. It does this in the sense that it accelerates the rate of cure during the early stages thereof; yet it does not produce a porous or brittle and non-useful type of finally cured product. This is probably its most important function in my composition, and will be elaborated below in connection with the discussion of catalysts. The point to be made here is that this ingredient makes it possible to have the advantage of accelerated early cure, without suffering the disadvantage of an unsatisfactory finally cured product of the kind produced by other cure acceleration procedures, e. g., addition of more catalyst or curing at higher temperatures.

I have used, as this ingredient, a bentonitic clay labeled "powdered colloidal clay." I have likewise used bentonitic clays identified as being semi-bentonites and "activated" semi-bentonites, and specifically the clay identified as "Palex 2," and sold by the Milwhite Company, Houston, Texas. I have used a product sold as fuller's earth. All these materials belong to the class of bentonites and semi-bentonites, the difference between the two terms believed to reside in the degree of swellability with water. All of them belong to the montmorillonite familiy of minerals, which have come into great prominence in recent years in connection with the drilling of oil wells. Fuller's earth has of course been known and used for generations, in connection with textile manufacture. I have used fuller's earth successfully as this type of ingredient in my composition. All of them produced satisfactory compositions, although use of the fuller's earth sample produced a slightly rough coating, and use of the sample identified as "powdered colloidal clay" gave compositions which were not quite as thixotropic as those prepared from the Milwhite semi-bentonite clays. Of the clays tested to date, Palex 2, and Filtrol, an "activated" semi-bentonite, have given the best products.

Of the natural bentonitic clays, I have found that those of higher pH, such as Milwhite 3 and Milwhite 5, sold by the Milwhite Company, are poorer than lower pH clays, in that they give a slower initial cure, although the final cure is satisfactory. The "activated" bleaching clays show high effectiveness. All members of the class tested have, however, been found effective to greater or lesser degree in the present application of them.

When a clay of my desired class is used as one ingredient of my compositions, less catalyst is required to produce curing, the cure starts more quickly and the coating is commonly tack-free within an hour. Re-coating can be satisfactorily started within about 2 hours. Although the cure is accelerated no over-curing, with attendant brittleness or sponginess, is observed. Without the clay ingredient, my compositions were found to require from 6 to 8 hours to become tack-free, and to require overnight standing to cure hard, and a good final cure is not obtained.

When acceleration of cure is attempted by using additional amounts of catalyst instead of my clay, difficulties are encountered. The polymerization reaction is a violent and difficultly controllable one, sensitive to small variations in the amount of catalyst and the polymerization temperature. The rapidly curing mass sometimes foams to produce a spongy mass. It may set in the spray gun, clogging it. The practical application of this means of inducing accelerated curing becomes impossible, or at least very uncertain, as is obvious from these facts. With my clay, the cure is accelerated in its initial stages; but such acceleration is at the same time so moderated spontaneously that the course of the cure is the desirable one, the end product having the required properties. Of course, inclusion of the clay also serves the purpose of endowing the compositions with desired thixotropic properties, for the prevention of sag and curtain.

Any acidic catalyst of sufficient activity appears to be useful in preparing my compositions, to promote the curing thereof. The list includes organic as well as inorganic acids. As stated above, the catalyzed reaction is a vigorous one and violent behavior can be induced by use of larger proportions of catalyst. If the cure is effected by the use of a catalyst alone, the final coating is sometimes spongy, the exothermic reaction evidently producing too much heat and so undesirably altering the final coating. It is possible at times to obtain a fast cure and secure a glassy, brittle coating, also undesirable, with comparatively large proportions of catalyst but with better reaction temperature control. If the catalyst is one of low activity, it is possible to secure an imperfect cure, even after long cure times. The type of cure is therefore obviously important, as well as the cure time. The rate of cure is important principally from the standpoint that use of rapidly curing compositions reduces the time required for successive applications of the coating. Type of cure is very important, in that a porous spongy coating is an ineffective one and a brittle coating may be chipped off the protected surface as used.

In my experiments, I have determined that use of the clay ingredient definitely and importantly reduces the amount of phosphoric acid required to be used as catalyst, without sacrificing cure time or producing imperfect curing. I have preferred, for a number of reasons, to use phosphoric acid (85%, syrupy, technical grade) as catalyst, rather than HCl, sulfuric acid, etc., which might have been used. Its activity or strength is not so great that, in the amounts employed, its use involves a difficultly controllable reaction. Yet its activity is sufficiently great to produce excellent cured coatings. Any residual phosphoric acid remaining after curing may be considered to combine with any ferrous metal surface present, in what may be thought of as a phosphatizing reaction, with the reaction product serving to protect further the underlying metal, if the coating is subsequently damaged. Ordinarily, however, I do not employ sufficient phosphoric acid to produce a continuous phosphate coating over the entire surface to be coated. Furthermore, phosphoric acid is dispersible in acetone; and such solution is readily dispersible through the composition mixture when added thereto. I am aware that phosphoric acid has been suggested in combination with polyvinyl butyral to produce an adhesion promoter for coating work. Sulfuric acid presents the possibility of reduction to hydrogen sulfide and subsequent attack by such product on metal surfaces. Hydrochloric acid would remain in the coating, as such, and might attack the metal surface. Organic sulfo acids would promote water-permeability of the film, in many cases. As stated above, use of a weak catalyst, or too small a proportion of an otherwise satisfactory catalyst, results in a long cure, and may even produce an imperfect cure. The use of the stated clay constituent in my compositions has been observed by me to permit reduction of the required amount of phosphoric acid by as much as 80%. Any acidic catalyst employed probably acts further to polymerize the polyvinyl resin present, in addition to promoting the polymerization of the furan derivatives present.

Briefly, then, the clays or clay-like minerals which I have found effective are members of the montmorillonite class consisting of bentonites, semi-bentonites, fullers' earths, and activated semi-bentonites.

Specifically, I prefer to use 85% syrupy phosphoric acid in the form of a 50% by weight, solution in acetone, and to employ about 1% to 4% by weight of such solution, equivalent to from 0.42% to 1.7% $H_3PO_4$ by weight, to produce my compositions. The acid could be added undiluted if desired, but use of the solution assists its dispersion through the mass and prevents any local excesses, thereby improving the reaction and the final product.

My compositions include a suitable organic solvent. This serves to dissolve the furfural, furfuryl alcohol, polyvinyl resin, and phosphoric acid. While methyl ethyl-or methyl isobutyl ketone, etc., are useful, I prefer to employ acetone, which is widely available, cheap, and readily volatilized during application of my compositions. The last property results in a minimum of blistering of the coating after application. I believe much of the acetone is in fact volatilized during spraying. In addition to serving as a solvent, this ingredient controls the viscosity of the compositions. Acetone further seems definitely to temper and to some degree affect the rate of cure, possibly by controlling concentrations. For example, if my preferred composition is prepared using polyvinyl butyral up to 4% of the whole, but without acetone, addition of the phosphoric acid catalyst produces a quick cure, even in bulk, a notable evolution of heat occurring. When acetone is included in the preparation of this same composition, using 4% polyvinyl butyral as before, both the bulk cure and the film cure rates are reduced, and especially the rise in temperature on addition of the phosphoric acid to the bulk sample is greatly reduced. I prefer to add my solvent in part to the mixture of ingredients and in part to the acidic catalyst which is later admixed therewith. As stated above, the catalyst may be used undiluted if desired, in which case all the solvent is incorporated into the mixture.

Pigments may be incorporated into my compositions, but are not necessary ingredients. Where used, they act as fillers. Because my compositions will be used in applications where dark-to-black colors are acceptable, the use of pigments will probably not be general. Use of pigments may be valuable for following the course of the application in re-coating. Dependence on light reflection from the fresh wet surface is sometime unsatisfactory, especially inside tanks and by artificial light. I have incorporated 1% of aluminum powder into some samples of my compositions. I have employed iron oxide in certain others. Both pigments have been found useful. Neither exhibited unfavorable characteristics, such as clogging the spray gun.

From the foregoing, it will be apparent that there are three broad embodiments of my invention. The first is the polymerizable coating mixture prepared from the four described classes of ingredients, but sans the acidic polymerization catalyst. This polymerizable coating mixture consists of: (A) about 58% to 65% of a mixture of furfural and furfuryl alcohol, in a ratio of between 45–55 and 65–35, and preferably about 55–45, furfural-to-furfuryl-alcohol; (B) about 2% to 8% of a polyvinyl resin; (C) about 6% to 20% of a montmorillonite clay, such as 6% to 10% of an "activated" semi-bentonite or such as 10% of a bentonitic clay and 3% of "activated" semi-bentonitic clay, such activated semi-bentonites being prepared in various ways, the commonest probably being by subjecting the clay to treatment with a mineral acid; and (D) about 16% of a suitable organic solvent; which mixture is polymerizable by being admixed with about 1% to 4% of an acidic polymerization catalyst. In this state, my compositions may be stored and shipped in commerce.

The second embodiment of my invention is a polymerizing coating composition intermediate constituting a mixture including: (A) about 58% to 65% of a mixture of furfural and furfuryl alcohol, in a ratio of between 45–55 and 65–35, and preferably about 55–45, furfuryl-to-furfuryl-alcohol; (B) about 2% to 8% of a polyvinyl resin; (C) about 20% of a bentonitic clay, or 6% to 10% of an activated clay, or a mixture of clays such as 10% of a bentonitic clay and 3% of an "activated" semi-bentonitic clay; and (D) about 16% of a suitable organic solvent; which mixture has just been admixed with about 1% to 4% of an acidic polymerization catalyst, to form an actively polymerizing composition. This second embodiment represents the state in which my compositions exist when wholly ready for application to any desired surface, and while they are being applied thereto.

The third embodiment of my invention is a polymerized coating composition, derived by the substantially completed polymerization of a mixture including: (A) about 58% to 65% of a mixture of furfural and furfuryl alcohol, in a ratio of between 45–55 and 65–35, and preferably about 55–45, furfural-to-furfuryl alcohol; (B) about 2% to 8% of a polyvinyl resin; (C) about 20% of a bentonitic clay, or 6% to 10% of an "activated" semi-bentonitic clay, or a mixture of same, such as 10% of a bentonitic clay and 3% of an "activated" clay; and (D) about 16% of a suitable organic solvent; said polymerization having been effected by admixing said mixture with about 1% to 4% of an acidic polymerization catalyst, shortly prior to application to a surface.

It should be noted that when bentonitic clays, semi-bentonitic clays, or fuller's earths are used, about 20% by weight of clay is needed to produce desirable materials, the exact amount being governed by the specific clay used; however, when an "activated" semi-bentonitic clay is used, such as "Super Filtrol," only 6% to 10% of clay is needed, again the exact amount being established by the activity of the specific clay used. It should be noted also that mixtures of various types of clays can be used. Any specific mixture which is chosen should be such that the total activity of the mixture is such as to produce a desirable final product.

Obviously, all three of these variations of my compositions are a part of, and lie within, my present invention. The first two differ only in the absence or presence of the acidic polymerization catalyst. The last two differ essentially only in time, the second being spontaneously convertible into the third with the lapse of time.

I have herein referred to the final state of my compositions as one of "substantially completed polymerization" by which term I intend to indicate that polymerization has proceeded at least sufficiently far to permit the coated surface to be placed into service. It is possible that the polymerization reaction may be very slightly short of complete at such time.

Ordinarily the acidic polymerization catalyst is added to the separately prepared mixture of the four described classes of ingredients. However, my invention is intended to include unusual cases where it may be possible and even preferable to apply the mixture or the catalyst to a surface, e. g., to a somewhat porous surface, and thereafter to accomplish polymerization in situ by applying the other reactant.

As a preferred example of my coating composition, the following is offered. Reasonable variations in ingredient proportions and manufacturing conditions are of course included, and the example is not intended to be exclusive of such variations.

I prefer to use a mixture of about 55 parts of furfural and 45 parts of furfuryl alcohol, the total proportion of furan derivatives used being about 58% to 65% of my finished composition as applied. Minor changes in the ratio of aldehyde to alcohol have not been found significant by me. My polyvinyl resin component is preferably polyvinyl butyral and which is used in an amount constituting about 2% to 8% of the whole composition; and I have preferred to use the product sold by Bakelite Corporation under the trade-name "Vinylite XYHL." It is intended in general that the amount of polyvinyl resin used be sufficient to impart desired thickening of the furan derivative mixture, but something less than would completely inhibit sag in the composition as applied. I include about 20% of a bentonitic clay or 6% to 10% of an "activated" semi-bentonite or mixtures of such clays, in my preferred composition, in part to thicken it and to impart the important property of thixotropy thereto. Use of too little of this ingredient gives a composition which sags or even curtains or runs. Use of too much causes unsatisfactory behavior in the gun. I prefer to include about 16% to 18% of acetone in my finished composition. Less than this proportion may be used if less polyvinyl resin is employed. Its use gives compositions sufficiently thin to pass the spray gun; while, as stated above, most of the solvent is believed to be lost during spraying. The gun residues are maintained in sufficiently fluid condition by such solvent to permit ready removal after completion of the job. Finally, shortly before use, I prefer to incorporate into my preferred composition about 2% of a 50–50 dispersion of 85% syrupy phosphoric acid in acetone.

Specifically, I heat about 58 pounds of the 55–45 mixture of furfural and furfuryl alcohol to about 80° C., and add about 6 pounds of polyvinyl butyral with stirring, at that temperature. Commonly a temperature over-ride is observed in the heating as conducted by me, so the heat is shut off when the temperature reaches 80° and stirring is continued during cool-down. By the time a temperature of 30–40° C. is reached, the clay (about 20 pounds) and the acetone (about 16 pounds) may be added; or their addition may be deferred till atmospheric temperature is reached. The clay may settle from the mixture; but it is readily redispersible into the mass.

As a second specific example, heat 30 pounds of furfural and 23 pounds of furfuryl alcohol to about 60° C. and add 2 pounds of polyvinyl butyral with stirring at that temperature. A temperature override is observed as above so the heat is shut off when the temperature reaches 60°, and stirring is continued until the mixture has cooled down to room temperature. To this mixture is then added, with stirring, 10 pounds of a semi-bentonite such as Palex #2 clay, sold by the Milwhite Co., and 8 pounds of a swelling bentonite, such as Wyobond Micromesh, sold by Wyoming Clay Co., and 15 pounds of acetone. This mixture is stirred until homogeneous.

As a further example I take 42 pounds of furfural and 30 pounds of furfuryl alcohol and heat them to 60° C., at which time the heat is shut off and 6 pounds of polyvinyl chloride, such as Bakelite VAGH, are added. Stirring is continued until the mixture has cooled to approximately room temperature. During the last stages of the cooling, or after room temperature has been reached, 7 pounds of an "activated" semi-bentonite or montmorillonite, such as Super Filtrol, sold by Filtrol Corp., and 15 pounds of acetone, are added. This mixture is stirred until homogeneous.

To spray a surface with any of these mixtures, add about 2 pounds of a 50-50 mixture of 85% syrupy phosphoric acid and acetone to the previously prepared mixture, stirring in well. Spray as soon as practicable. In the spray gun cup, the composition sets rather slowly and is usually sprayable for about one or two hours after addition of catalyst, and in bulk is commonly still partially fluid after 24 hours. In films, as sprayed, the cure rate is much more rapid, as stated above, the films becoming tack-free in about one hour. Re-coating may ordinarily be started within about 2 hours. Varying the catalyst proportion will change the cure time, as stated above; but in general considerable latitude is available in the use of the preferred composition just described.

The following table includes a number of preferred embodiments of my invention (the proportions given being weight proportions):

influences the final balance between hardness or brittleness and flexibility. When more furfural is used the tendency is toward hardness or brittleness; with more furfuryl alcohol, toward rubberiness or even sponginess, so far as my experience to date has disclosed. The polyvinyl resin exemplifies a resin soluble in the furan derivative mixture intended to be polymerized in situ. Such polyvinyl resin is also considered to be substantially inert to the conditions of use expected to be encountered. The amount employed is in each instance the optimum amount required to confer the best spraying or brushing properties, as the case may be. The amount required may not be the same for different types of application methods, or for different specific resins. My clay component is not used as a filler; and I do not believe that commonly used fillers will meet my requirements. My clay component thickens the mix, prevents sag, and particularly acts to accelerate the cure rate in the early stages thereof, without permitting such cure to be accelerated to the degree where a different type of finally or completely cured end product results. This is the failing of previously suggested cure accelerators or catalysts; they produced glassy or spongy coatings or otherwise unsatisfactory films, unless the amount of catalyst added and the reaction conditions were carefully controlled within close limits. Inability to secure such control on the job makes such approach to the curing problem an impracticable one from the industrial or commercial standpoint.

The catalyst selection will be influenced by the

| Ex. No. | A Furfural | B Furfuryl alcohol | C Vinyl resin | D Clay | E Acetone | F Phosphoric acid solution | G Filler |
|---|---|---|---|---|---|---|---|
| 1 | 32 | 26 | XYHL—6 | Palex No. 2—20 | 16 | 2 | None. |
| 2 | 32 | 26 | XYHL—7 | ---do--- | 16 | 2 | Do. |
| 3 | 32 | 26 | XYHL—6 | Bentonite—17 | 18 | 2 | Do. |
| 4 | 32 | 26 | ---do--- | Fuller's earth—18 | 15 | 2 | Do. |
| 5 | 33 | 25 | ---do--- | Palex No. 2—20 | 16 | 2 | Do. |
| 6 | 31 | 27 | ---do--- | ---do--- | 16 | 2 | Do. |
| 7 | 34 | 24 | ---do--- | ---do--- | 16 | 2 | Do. |
| 8 | 33.25 | 26.25 | XYHL—3.5 | {Palex No. 2—11.75, M. M.—7.25} | 18 | 2 | Do. |
| 9 | 42.3 | 29.7 | VAGH—6 | Super filtrol—7.0 | 15 | 1.5 | Do. |
| 10 | 32 | 26 | XYHL—4 | {M. M.—8.3, Palex No. 2—10.7} | 18 | 2 | Do. |
| 11 | 32.6 | 29.4 | VAGH | {Palex No. 2—14, Super filtrol—2} | 4 | 2 | Fibrene C-400. |
| 12 | 43 | 29 | {XYHL—2, VAGH—4} | Special filtrol—8 | 14 | 1.5 | None. |
| 13 | 26.6 | 21.4 | XYHL—4 | Palex No. 2—18 | 15 | 2 | Super X silica—15. |
| 14 | 37 | 30 | XYHL—3 | Palex No. 2—16 | 10 | 2.5 | Carbon black—4. |
| 15 | 34.7 | 27.4 | VYHH—8 | {Palex No. 2—10, M. M.—5} | 15 | 2 | None. |

NOTES:
XYHL—Bakelite polyvinyl butyral.
VAGH—Bakelite polyvinyl chloride-acetate copolymer.
VYHH—Bakelite polyvinyl chloride-acetate copolymer.
Palex No. 2—semi-bentonite.
M. M.—swelling bentonite.
Super Filtrol—"activated" semi-bentonite.
Special Filtrol—"activated" montmorillonite.

In preparing each of the foregoing examples, the mixture of (A) and (B) was heated to about 80° C. and (C) stirred in on cool-down; (D) and (E) were added at about 30-40° C. Addition of (F) was made within 15 minutes before applying to a surface. It was introduced in the form of a 50% acetone solution, and admixed thoroughly.

In the broadest sense any slight variations in the proportions of the several components of my compositions are dictated by a consideration of the requirements and conditions of expected use. For instance, the ratio of furfural to furfuryl alcohol in the furan derivative component purpose for which the composition is to be applied and the nature of the surface to be protected. The total amount and the concentration of the acidic catalyst employed will be influenced by the specific purpose for which the composition is to be used. In general, however, the objective sought is a comparatively fast film cure rate and a comparatively slow bulk cure rate. It is also a notable characteristic of my compositions that curing takes place at atmospheric temperatures, to the production of a satisfactory end product and within a reasonably short time. What has been emphasized throughout this application is that the clay component is the heart of the present compositions. This is true because it positively and favorably affects the course of the curing reaction and the character of the finished cured coating. Its action is not simply one of accelerating curing; this could be accomplished by use of larger proportions of mineral acid, for example. Also, it is not sufficient to state negatively that my clay component does not adversely affect the character of the finished cured coating. Rather, it should be said that this component of the mixture both accelerates the cure and directs it favorably to the production of a high-quality finished coating.

As stated above, the principal purpose for which my material was developed was the protection of the interiors of oil industry equipment, and particularly the protection of the interiors of crude oil and petroleum products tanks, against the corrosive effects of oil, water, dilute salt solutions, corrosive gases like $H_2S$, $CO_2$, $O_2$, solvent and other vapors, etc.

In applying my material to a crude oil storage tank, for example, I prefer to proceed as follows: The tank to be coated is first cleared of crude oil, including probable accumulations of "tank bottoms," wax, emulsion, sediment, etc. The tank is then washed with a stream of water from a hose, further to remove oily residues from the steel sheet surfaces. Thereafter, since best results are obtained when my coating compositions are applied to clean surfaces, the tank is sand-blasted to remove any remaining oily matter and also any scale or corrosion products adhering to the steel.

My compositions are ordinarily prepared, stored, and shipped in the form of a mixture of all the ingredients except the acidic catalyst solution. A portion of such catalyst-free mixture, of such size that all will be consumed within the space of about an hour, is mixed with the desirable amount of acidic catalyst as set forth above. Immediately after the catalyst has been added and admixed, spraying is begun, and continued expeditiously until all the catalyzed composition has been applied to the tank surfaces. In the case of large tanks, it may be desirable to have a central supply tank of catalyzed composition, with pressure applied thereto in order to force the mixture to a number of spray guns manipulated by a number of operators. However, in general, my compositions are to be applied in the same and conventional equipment and apparatus as is now being used to apply other similar protective coatings to such tanks.

As stated above, the time before applying a second coat of my composition is relatively short, usually of the order of an hour or so. It is sometimes desirable to introduce a small proportion of some pigment, like aluminum powder or iron oxide, to alternate coats, to insure perfect coverage of the surface, and absence of "holidays." This is a matter of choice; such pigments are not a vital or necessary part of my compositions and their inclusion therein is optional.

I prefer to apply three coats of my composition for oil storage tanks subject to average or "normal" service conditions. It is understood that as few as one coat may suffice; or a large number of coats may be applied for severe service conditions. The bonding of subsequent coats of my composition to the coats already applied has been most satisfactory, in my experience.

Because the problem is most severe in those portions of oil storage tanks subjected to oil and water vapors, the so-called vapor space of the tank, my compositions will probably find widest application in protecting vapor space surfaces from corrosion attack.

Coating compositions presently in use are not satisfactory for this vapor space application. They frequently sag and fall off in warm weather, and especially when freshly or recently applied. The bottoms of tanks are today often being coated with comparatively inexpensive materials in coats as thick as ⅜ inch; and such application is possible because there is no "sagging" or "curtain" problem, the steel surfaces being substantially horizontal. However, my invention includes the coating of all interior surfaces of the tank. Single film thickness, when my composition is used, is about 0.008 inch (8 mils).

Because of the stability of my coating under temperatures considerably above atmospheric, it is applicable in many situations where no satisfactory coating composition has been developed to date.

In applying my material to porous surfaces, such as wood or certain stone desk tops and the like, some variation in formulation may be advantageously effected. This is true because absorption of the composition by the surface pores of the surface to be treated prevents to considerable degree sagging or "curtain." Such applications are relatively little concerned with flexibility considerations, as a rule.

Entirely aside from the mineral or clay-like materials used herein to catalyze the resinification reaction, I have found that various acid-alkali exchange resins now available will serve satisfactorily for the same purpose, or a mixture of such resins in combination with clays or clay-like minerals herein described will serve as a cure catalyst, and directing influence.

Having thus described my invention, what I claim as new and desire to secure by Letters Patent is:

1. An article comprising a structure having thereon a coating comprising a polymerized coating composition, derived by the substantially completed polymerization on said structure of a mixture including: (A) about 58%–65% of a mixture of furfural and furfuryl alcohol, in a ratio of between 45–55 and 65–35 furfural-to-furfuryl alcohol; (B) about 2%–8% of a hard ketone-soluble polyvinyl resin; (C) about 6%–20% of a montmorillonite clay from the class consisting of bentonites, semi-bentonites, fuller's earths, and activated semi-bentonites; and (D) about 14%–18% of a volatile organic solvent; said polymerization having been effected by admixing said mixture with about 1%–4% of an acidic polymerization catalyst, shortly prior to application to the structure.

2. An article comprising a structure having thereon a coating comprising a polymerized coating composition, derived by the substantially completed polymerization on said structure of a mixture including: (A) about 58%–65% of a mixture of furfural and furfuryl alcohol in a ratio of between 45–55 and 65–35, furfural-to-furfuryl-alcohol; (B) about 2%–8% of a hard ketone-soluble resin selected from the class consisting of polyvinylbutyrals, polyvinyl chlorides and copolymers of polyvinyl chloride-polyvinyl acetate; (C) about 6%–20% of a montmorillonite clay consisting of bentonites, fuller's earths, semi-bentonites and activated semi-bentonites; and (D) about 14%–18% of a volatile organic solvent; said polymerization having been effected by admixing said mixture with about 1%–4% of an acidic polymerization catalyst, shortly prior to application to the structure.

3. The article of claim 2 wherein the organic solvent is acetone and the acid is phosphoric acid.

4. The article of claim 1 wherein the organic solvent is acetone, the acid is phosphoric acid, and the vinyl resin is polyvinyl butyral.

5. The article of claim 2 wherein the organic solvent is acetone, the acid is phosphoric acid, the vinyl resin is polyvinyl butyral, and the clay is a bentonitic clay present to the extent of about 20%.

6. The article of claim 2 wherein the organic solvent is acetone, the acid is phosphoric acid, the vinyl resin is polyvinyl butyral, and the clay is an activated semi-bentonitic clay and is present to the extent of about 10%.

7. The article of claim 2 wherein the organic solvent is acetone, the acid is phosphoric acid, the vinyl resin is polyvinyl butyral, and the clay is a mixture of a bentonitic clay and an activated semi-bentonite present to the extent of about 10% to 20%.

8. A process for coating the surface of an article which includes applying to the surface a polymerized coating composition, derived by the substantially completed polymerization of a mixture including: (A) about 58%–65% of a mixture of furfural and furfuryl alcohol, in a ratio of between 45–55 and 65–35 furfural-to-furfuryl-alcohol; (B) about 2%–8% of a hard ketone-soluble polyvinyl resin; (C) about 6%–20% of a montmorillonite clay selected from the class consisting of bentonites, semi-bentonites, fuller's earths, and activated semi-bentonites; and (D) about 14%–18% of a volatile organic solvent; said polymerization having been effected by admixing said mixture with about 1%–4% of an acidic polymerization catalyst, shortly prior to application to the surface.

9. A process for coating the surface of an article which includes applying to the surface a polymerized coating composition, derived by the substantially completed polymerization of a mixture including: (A) about 58%–65% of a mixture of furfural and furfuryl alcohol, in a ratio of between 45–55 and 65–35, furfural-to-furfuryl alcohol; (B) about 2%–8% of a hard ketone-soluble resin selected from the class consisting of polyvinylbutyrals, polyvinyl chlorides and copolymers of polyvinyl chloride-polyvinyl acetate; (C) about 6%–20% of a montmorillonite clay consisting of bentonites, fuller's earths, semi-bentonites and activated semi-bentonites; and (D) about 14%–18% of a volatile organic solvent; said polymerization having been effected by admixing said mixture with about 1%–4% of an acidic polymerization catalyst, shortly prior to application to a surface.

10. The process of claim 9 wherein the organic solvent is acetone.

11. The process of claim 9 wherein the organic solvent is acetone and the acid is phosphoric acid.

12. The process of claim 8 wherein the organic solvent is acetone, the acid is phosphoric acid, and the vinyl resin is polyvinyl butyral.

13. The process of claim 9 wherein the organic solvent is acetone, the acid is phosphoric acid, the vinyl resin is polyvinyl butyral, and the clay is a bentonitic clay present to the extent of about 20%.

14. The process of claim 9 wherein the organic solvent is acetone, the acid is phosphoric acid, the vinyl resin is polyvinyl butyral, and the clay is an activated semi-bentonitic clay and is present to the extent of about 10%.

15. The process of claim 9 wherein the organic solvent is acetone, the acid is phosphoric acid, the vinyl resin is polyvinyl butyral, and the clay is a mixture of a bentonitic clay and an activated semi-bentonite present to the extent of about 10% to 20%.

16. A process for coating the surface of an article which includes applying to the surface a polymerized coating composition, derived by the substantially completed polymerization of a mixture including: (A) about 58%–65% of a mixture of furfural and furfuryl alcohol, in a ratio of between 45–55 and 65–35 furfural-to-furfuryl-alcohol; (B) about 2%–8% of a hard ketone-soluble polyvinyl resin; (C) about 6%–20% of a montmorillonite clay selected from the class consisting of bentonites, semi-bentonites, fuller's earths, and activated semi-bentonites; and (D) about 14%–18% of a volatile organic solvent; said polymerization having been effected by admixing said mixture with about 1%–4% of an acidic polymerization catalyst, shortly prior to application to the surface; with the added proviso that said polymerized coating composition be steel-adherent, substantially non-porous, and sufficiently flexible to be substantially non-chipping under usual conditions of use.

17. A process for coating the surface of an article which includes applying to the surface a polymerized coating composition, derived by the substantially complete polymerization of a mixture including: (A) about 58%–65% of a mixture of furfural and furfuryl alcohol, in a ratio of between 45–55 and 65–35, furfural-to-furfuryl alcohol; (B) about 2%–8% of a hard ketone-soluble resin selected from the class consisting of polyvinylbutyrals, polyvinyl chlorides and copolymers of polyvinyl chloride-polyvinyl acetate; (C) about 6%–20% of a montmorillonite clay consisting of bentonites, fuller's earths, semi-bentonites and activated semi-bentonites; and (D) about 14%–18% of a volatile organic solvent; said polymerization having been effected by admixing said mixture with about 1%–4% of an acidic polymerization catalyst, shortly prior to application to the surface; with the added proviso that said polymerized coating composition be steel-adherent, substantially non-porous, and sufficiently flexible to be substantially non-chipping under usual conditions of use.

18. An article as defined in claim 1 wherein the structure having the coating thereon is steel.

19. An article as defined in claim 2 wherein the structure having the coating thereon is steel.

20. An article as defined in claim 5 wherein the structure having the coating thereon is steel.

21. An article as defined in claim 6 wherein the structure having the coating thereon is steel.

22. An article as defined in claim 7 wherein the structure having the coating thereon is steel.

KENNETH J. LISSANT.

References Cited in the file of this patent

UNITED STATES PATENTS

| Number | Name | Date |
|---|---|---|
| 2,095,250 | Heberer | Oct. 10, 1937 |
| 2,267,830 | Lewis | Dec. 30, 1941 |
| 2,366,049 | Payne | Dec. 26, 1944 |
| 2,486,392 | Dunlop et al. | Nov. 1, 1949 |